J. T. RONALD.
WHEEL RIM.
APPLICATION FILED MAR. 14, 1917.

1,233,705.

Patented July 17, 1917.

Inventor
James T. Ronald
By C. D. Huskins
Attorney

UNITED STATES PATENT OFFICE.

JAMES T. RONALD, OF SEATTLE, WASHINGTON.

WHEEL-RIM.

1,233,705.  Specification of Letters Patent.  Patented July 17, 1917.

Application filed March 14, 1917. Serial No. 155,101.

*To all whom it may concern:*

Be it known that JAMES T. RONALD, citizen of the United States, residing at Seattle, in the county of King and State of Washington, have invented a certain new and useful Improvement in Wheel-Rims, of which the following is a specification.

My invention relates to improvements in wheel-rims, of that class an example of which is disclosed in United States Letters Patent No. 1,203,134, granted to me October 31, 1916, for wheel rim, and which are adapted to be removably disposed to surround the fellies of vehicle wheels, as automobile wheels, and upon which wheel-rims may be removably mounted pneumatic tires of a common form; and the object of my invention is to provide a metal wheel-rim made of two separable flanged members which are joined one to the other by a telescopic joint and which are provided with detachable locking devices that are adapted to be disposed releasably to lock and maintain them in their joined relation to form a unitary wheel-rim.

I accomplish this object by devices illustrated in the accompanying drawings wherein—

Figure 1:
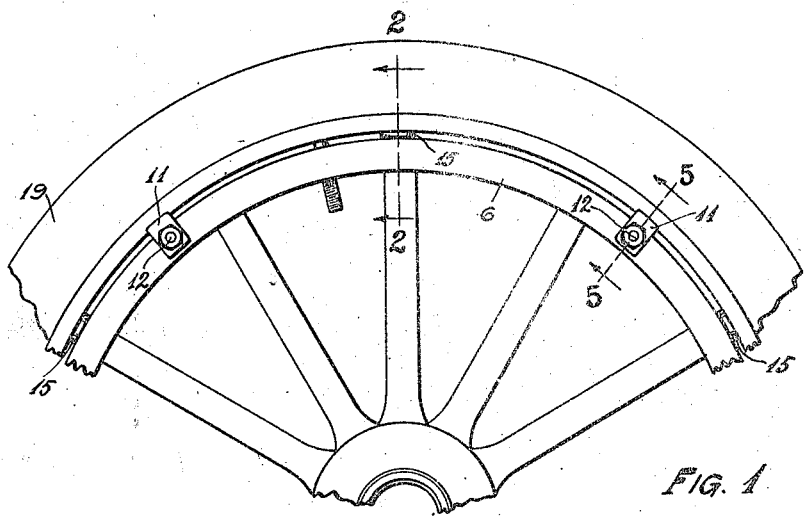
Figure 1 is a view in side elevation of a segment of an automobile wheel provided with a wheel-rim embodying my invention.

Referring to the drawings, throughout which like reference numerals indicate like parts, 6 designates the felly of an automobile wheel which is surrounded by a tightly fitting band 7 that is provided on one of its edges with a curved flange 8 which serves to engage with and support one flanged member of a wheel-rim whose other flanged member 10 is joined to said member 9 by a telescopic joint, as shown in Figs. 2, 3, 4 and 5, said other member 10 being engaged with and supported by a plurality of clamps, as the clamps 11, in a well known manner.

Figure 5:
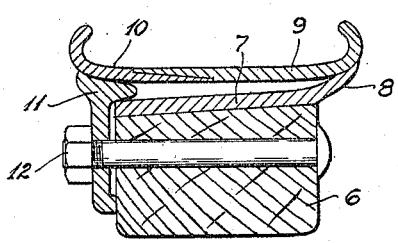
Fig. 5 is a view in radial section on broken line 5, 5 of Fig. 1.

The clamps 11 are secured in their positions by bolts, as bolts 12, which extend through the felly 6, from one side to the other side thereof, as shown more clearly in Fig. 5, whereby the wheel-rim, comprising the telescopically joined members 9 and 10, is rigidly confined in its position to surround the metal band 7, in a well known manner.

Figure 3:
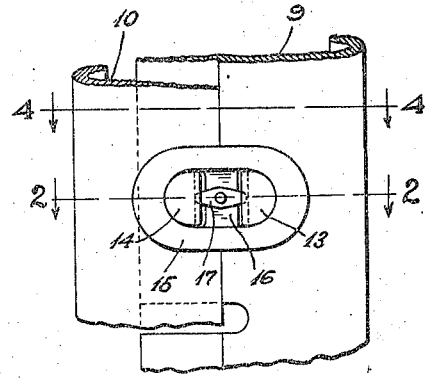
Fig. 3 is a view of the internal circular surface of a segmental portion of a wheel-rim embodying my invention, showing one of its locking devices disposed to lock together its separable parts.
Figure 4:
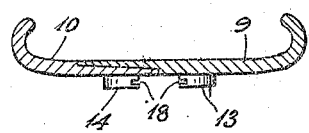
Fig. 4 is a view of the same in radial section on broken line 4, 4 of Fig. 3, showing the wheel-rim with one member of said locking device removed.

At each of equi-distant points around the inner circular surface of the wheel-rim its members 9 and 10 are each provided with integral lugs, as lugs 13 and 14, respectively, each being of semi-circular form in outline, which lugs 13 and 14 are so relatively disposed with their straight side edges opposite each other, when the members 9 and 10 are telescopically joined, that there shall be space between said straight side edges as indicated more clearly in Figs. 3 and 4.

Disposed to surround and engage with the circular side edges of adjacent ones of the lugs 13 and 14 is an oblong metal link 15 which is provided with an integral cross-bar 16 which is disposed within the space between the straight side edges of the lugs 13 and 14, as indicated more clearly in Fig. 3.

Figure 2:
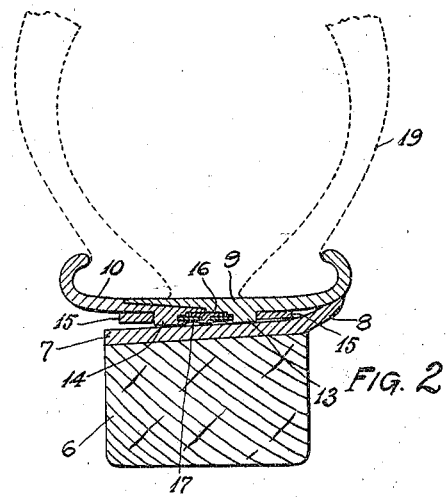
Fig. 2 is an enlarged view in radial section on broken line 2, 2 of Fig. 1.

The inner side surface of the link 15 and the cross-bar 16 register with each other to be in the same plane, while the thickness of the bar 16 is much less than the thickness of the link 15, thereby to provide room for a button 17 that is pivotally mounted on the outer side surface of the cross-bar 16 at its central point, said button 17 being of such thickness that its outer side surface shall not project outwardly beyond the end surfaces of the lugs 13 and 14 and the outer side surface of the link 15, as indicated in Fig. 2.

The straight side edges of the lugs 13 and 14 are each provided with a slot, as slots 18 shown more clearly in Fig. 4, which extends lengthwise thereof, and the opposite end portions of the button 17 are of such thickness as will adapt them respectively to enter said slots 18 in response to a rotative movement of said button 17 thereby to prevent the link 15 from being displaced from its position with respect to the lugs 13 and 14 and thus to maintain the members 9 and 10 in their telescopically joined relation during any time that the wheel-rim is not mounted in its operative position on the metal band 7 of the felly 6 of a wheel.

Obviously, the only useful purpose of the button 17 is to maintain the link 15 in its position when the wheel-rim is dismounted, since if the wheel-rim be mounted on the band 7 then said link 15 cannot be displaced; and likewise the chief function of the link 15 and lugs 13 and 14 is to maintain the members 9 and 10 locked together during times that the wheel-rim is dismounted, since, when the wheel-rim is mounted in its operative position on the band 7, said members 9 and 10 cannot separate by reason of the clamps 11 and the flange 8 of the band 7.

Thus a wheel-rim comprising two separable members 9 and 10 that are telescopically joined and provided with releasable locking devices like the lugs 13 and 14 and their associated link 15 and button 17, may be quickly dismounted from the band 7 of a wheel, its members separated by turning the buttons 17 and removing its links 15 whereupon its pneumatic tire, as a tire 19 may be removed for repairs, (or to replace it with a new tire) which tire when repaired, or the new one, can then be mounted on the members 9 and 10 which may then be telescopically joined and locked together by the links 15 and lugs 13 and 14, whereupon the wheel-rim with its pneumatic tire may be mounted in its operative position and there secured by the clamps 11 in an obvious manner.

What I claim is:

1. A wheel-rim of the class described, which comprises two separable flanged bands joined one to the other by a telescopic joint; a plurality of lugs disposed to project from the inner circular surfaces of both of said bands at corresponding points thereof, the lugs of one band being spaced from the lugs of the corresponding oppositely disposed lugs of the other band, and each of the adjacent sides of oppositely disposed ones of said lugs being provided with a slot extending parallel with the plane of their end surfaces; a separate link removably disposed to extend around and bind together both of opposite ones of all of said lugs, each of said links having an integral cross-bar extending between its opposite side members and through the space between its associated lugs; and separate means for releasably maintaining each of said links in its position to bind together its associated lugs, thereby releasably to maintain the integrity of said telescopic joint.

2. A wheel-rim of the class described, which embodies two separable metal bands united by a telescopic joint; a plurality of pairs of lugs projecting from the internal surface of said wheel-rim, one lug of each of said pairs being spaced from the other thereof and disposed on a different one of said metal bands; a separate link removably disposed to encircle each of said pairs of lugs rigidly to unite the lugs thereof, said link having an integral cross-bar extending between its opposite side members and through the space between the adjacent lugs; and a button pivotally mounted on the cross-bar of said link in a position to adapt it to engage its end portions with the adjacent lugs in response to a rotative movement of it thereby to maintain said link in its normal position rigidly to unite said lugs.

In witness whereof, I hereunto subscribe my name this 5th day of March A. D., 1917.

JAMES T. RONALD.